(12) United States Patent
Le Borgne et al.

(10) Patent No.: US 12,718,340 B2
(45) Date of Patent: Aug. 25, 2026

(54) METHOD FOR DETERMINING AREAS OF LAND COMPATIBLE WITH THE INSTALLATION OF PHOTOVOLTAIC PANELS

(71) Applicant: TotalEnergies SE, Courbevoie (FR)

(72) Inventors: Emmanuel Le Borgne, Chatillon (FR); Gilles Poulain, Antony (FR); Théo Vanneuville, Croissy-Sur-Seine (FR); David Benhaiem, Viroflay (FR)

(73) Assignee: TotalEnergies SE, Courbevoie (FR)

( * ) Notice: Subject to any disclaimer, the term of this patent is extended or adjusted under 35 U.S.C. 154(b) by 256 days.

(21) Appl. No.: 18/286,026

(22) PCT Filed: Apr. 8, 2022

(86) PCT No.: PCT/EP2022/059417
§ 371 (c)(1),
(2) Date: Oct. 6, 2023

(87) PCT Pub. No.: WO2022/214654
PCT Pub. Date: Oct. 13, 2022

(65) Prior Publication Data

US 2024/0185403 A1 Jun. 6, 2024

(30) Foreign Application Priority Data

Apr. 9, 2021 (FR) ...................................... 21 03644

(51) Int. Cl.
*G06T 7/00* (2017.01)
*G06T 7/11* (2017.01)
(Continued)

(52) U.S. Cl.
CPC .............. *G06T 7/0002* (2013.01); *G06T 7/11* (2017.01); *G06T 7/50* (2017.01); *G06T 7/70* (2017.01);
(Continued)

(58) Field of Classification Search
CPC .... G06V 10/774; G06V 10/764; G06V 10/82; G06V 10/255; G06V 20/13; G06T 7/70;
(Continued)

(56) References Cited

FOREIGN PATENT DOCUMENTS

JP 2014149213 A * 8/2014

OTHER PUBLICATIONS

Zhang, Wen, et al. "Evaluation of the photovoltaic potential in built environment using spatial data captured by unmanned aerial vehicles." Energy Science & Engineering 7.5 (2019): 2011-2025. (Year: 2019).*

(Continued)

*Primary Examiner* — Tracy Mangialaschi
(74) *Attorney, Agent, or Firm* — Troutman Pepper Locke LLP

(57) ABSTRACT

The present invention relates to a method for determining areas of land, called candidate areas, distinct from buildings and compatible with the installation of photovoltaic panels, the method comprising the following steps:

the reception of images seen from the sky of a territory, classifying each image containing an image of at least one candidate area into a first image class, carried out by a trained classification model processing each image of the first class so as to obtain a processed image on which the shape of each candidate area is highlighted, carried out by a trained segmentation model; and characterizing each candidate area by determining, from the shape of the highlighted area, a geometric feature useful for installing photovoltaic panels on the candidate area.

13 Claims, 3 Drawing Sheets

(51) Int. Cl.

| | |
|---|---|
| ***G06T 7/50*** | (2017.01) |
| ***G06T 7/70*** | (2017.01) |
| ***G06V 10/764*** | (2022.01) |
| ***G06V 10/774*** | (2022.01) |
| ***G06V 10/82*** | (2022.01) |
| ***G06V 20/13*** | (2022.01) |

(52) U.S. Cl.
CPC .......... *G06V 10/764* (2022.01); *G06V 10/774* (2022.01); *G06V 10/82* (2022.01); *G06V 20/13* (2022.01); *G06T 2207/10032* (2013.01); *G06T 2207/20081* (2013.01); *G06T 2207/20084* (2013.01); *G06T 2207/30181* (2013.01)

(58) Field of Classification Search
CPC . G06T 7/11; G06T 7/0002; G06T 7/50; G06T 2207/20084; G06T 2207/10032; G06T 2207/20081; G06T 2207/30181; G06N 3/0464; G06N 3/045; G06N 3/09; G06N 3/08
See application file for complete search history.

(56) References Cited

OTHER PUBLICATIONS

Lee, Stephen, et al. "Deeproof: A data-driven approach for solar potential estimation using rooftop imagery." Proceedings of the 25th ACM SIGKDD international conference on knowledge discovery & data mining. 2019. (Year: 2019).*
Rapport De Recherche Internationale issued in International Patent Application No. PCT/EP2022/059417 dated Jul. 29, 2022.
Rapport De Recherche Préliminaire issued in French Patent Application No. 2103644 dated Dec. 10, 2021.
Zhang, W., et al. "Evaluation of the photovoltaic potential in built environment using spatial data capture by unmanned aerial vehicles" Energy Science & Engineering, pp. 2011-2025 (2019).

* cited by examiner

METHOD FOR DETERMINING AREAS OF LAND COMPATIBLE WITH THE INSTALLATION OF PHOTOVOLTAIC PANELS

CROSS REFERENCE TO RELATED APPLICATIONS

The present application is a U.S. National Phase Application under 35 U.S.C. § 371 of International Patent Application No. PCT/EP2022/059417 filed Apr. 8, 2022, which claims priority of French Patent Application No. 21 03644 filed Apr. 9, 2021. The entire contents of which are hereby incorporated by reference.

FIELD OF THE INVENTION

The present invention relates to a method for determining zones of a territory, compatible with the installation of photovoltaic panels. The invention further relates to an associated computer program method with such method.

BACKGROUND

The production of electricity from renewable energies is a challenge for our societies. To this end, dedicated installations have been developed, comprising photovoltaic panels which are used for producing electricity from solar energy. Photovoltaic panels are conventionally installed on the roofs of buildings, for maximizing the energy recovered.

The large-scale deployment of photovoltaic panels requires the identification of other zones of a territory, compatible with the installation of such panels. However, the identification of such zones on mappings is not easy. It is possible to rely on data communicated by users indicating the nature of zones present on a map. However, it is not thereby possible to precisely and exhaustively identify such zones.

SUMMARY

There is thus a need for a tool for helping an operator to identify zones of a territory which are compatible with the installation of photovoltaic panels.

To this end, the present description relates to a method for determining zones of a territory, called candidate zones, distinct from buildings and compatible with the installation of photovoltaic panels, the candidate zones being formed by an area of one or a plurality of elements of the same nature over several meters long and several meters wide, the elements being suitable for receiving direct sunlight, the process being implemented by computer and comprising the following steps:

a. training of a classification model on a database comprising images seen from the sky of candidate zones, for obtaining a classification model trained to classify into the same class, images imaging at least one candidate zone,
b. training of a segmentation model on a database comprising images seen from the sky of candidate zones, for obtaining a segmentation model trained to highlight candidate zones imaged on images,
c. the reception of images seen from the sky of a territory,
d. the classification, by the trained classification model, of each image on which at least one candidate zone is imaged, in a first class of images, e. the processing each image of the first class so as to obtain a processed image on which the shape of each candidate area is highlighted, carried out by a trained segmentation model; and
f. The characterization each candidate zone by determining, from the shape of the highlighted zone, a geometric feature useful for installing photovoltaic panels on the candidate zone.

According to other particular embodiments, the method comprises one or more of the following features, taken individually or according to all technically possible combinations:

- at least one geometric feature is related to the footprint, on the candidate area, of elements, such as buildings, exterior to the candidate zone;
- the characterization step comprises the determination of parts of each candidate zone, shaded by elements exterior to the candidate zone, according to the footprint of said exterior elements, the shaded parts being advantageously highlighted on the processed image;
- the characterization step comprises the determination of parts of each candidate zone, on which there is a predefined parasitic element masking the direct sunlight, at least one geometric feature being relative to the shape of the candidate zone after removal of the masked parts, the masked parts being advantageously filtered or highlighted on the processed image;
- at least one geometric feature is a coefficient relating to the rectangularity of the candidate zone, the coefficient of rectangularity being obtained by comparing the surface area of the candidate zone with the surface area of the smallest rectangle shape surrounding the shape of the candidate zone highlighted on the processed image;
- at least one geometric feature relates to the orientation of the longer side of the candidate zone when the candidate zone has a substantially rectangular shape, aimed at determining a layout of photovoltaic panels on the candidate zone;
- the segmentation model implements at least two segmentation algorithms suitable for highlighting candidate zones, the candidate zones highlighted on the processed images, by the trained segmentation model, resulting from the merging of the results obtained by the two algorithms, preferentially one algorithm being a so-called Mask R-CNN algorithm and another algorithm being a so-called DeepLab algorithm;
- the method further comprises a step of determining the irradiance of at least one candidate zone highlighted on the processed images;
- the candidate zones are chosen from the group consisting of: outdoor parking lots, wooded areas and bodies of water.

The present description further relates to a computer program product comprising program instructions stored on a computer-readable storage medium, for the execution of a method as described above when the computer program is executed on a computer.

The present description further relates to a readable information medium on which is stored a computer program product such as described hereinabove.

BRIEF DESCRIPTION OF THE DRAWINGS

Other features and advantages of the invention will appear upon reading hereinafter the description of the embodiments of the invention, given only as an example, and making reference to the following drawings.

DETAILED DESCRIPTION

Figure 1:
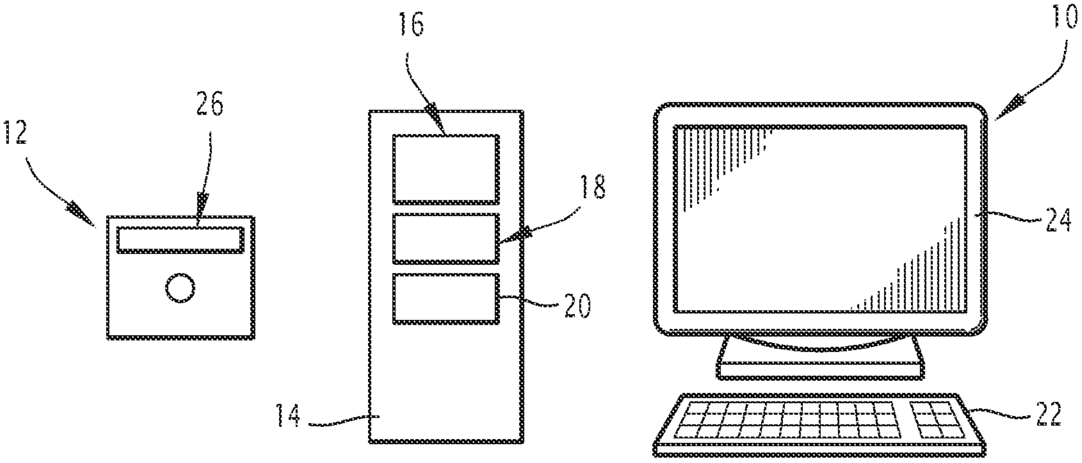
FIG. 1, a schematic view of an example of a computer used for the implementation of a method for determining zones of a territory, compatible with the installation of photovoltaic panels.

A calculator 10 and a computer program product 12 are shown in FIG. 1.

The calculator 10 is preferentially a computer.

More generally, the calculator 10 is an electronic calculator suitable for manipulating and/or transforming data represented as electronic or physical quantities in registers of the calculator 10 and/or memories into other similar data corresponding to physical data in memories, registers or other types of display, transmission or storage.

The calculator 10 interacts with the computer program product 12.

As shown in FIG. 1, the calculator 10 comprises a processor 14 comprising a data processing unit 16, memories 18 and a data storage medium 20. In the example illustrated in FIG. 1, the calculator 10 comprises a keyboard 22 and a display unit 24.

The computer program product 12 comprises a storage medium 26.

The storage medium 26 is a medium readable by the calculator 10, usually by the data processing unit 16. The readable storage medium 26 is a medium suitable for storing electronic instructions and apt to be coupled to a bus of a computer system.

As an example, the storage medium 26 is a diskette or a floppy disk, an optical disk, a CD-ROM, a magneto-optical disk, a ROM, a RAM, an EPROM, an EEPROM, a magnetic card or an optical card.

The computer program 12 containing program instructions is stored on the storage medium 26.

The computer program 12 can be loaded into the data processing unit 16 and is suitable for leading to the implementation of a method for determining zones of a territory, compatible with the installation of photovoltaic panels, when the computer program 12 is implemented on the processing unit 16 of the calculator 10.

Figure 2:
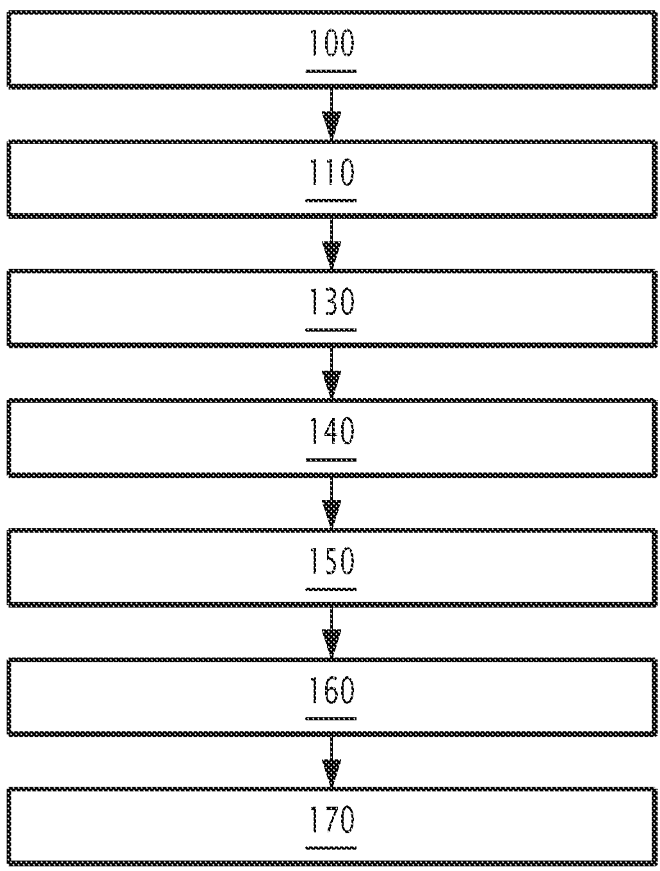
FIG. 2, a flowchart of an example of implementation of a method for determining zones of a territory, compatible with the installation of photovoltaic panels, FIG. 3, a schematic representation of an example of a processed image on which candidate zones for the installation of photovoltaic panels are highlighted.

The operation of the calculator 10 will now be described with reference to FIG. 2 which schematically illustrates an example of the implementation of a method for determining zones of a territory, compatible with the installation of photovoltaic panels (solar panels), and to FIG. 3 which illustrates an example of an image obtained during the implementation of the method.

The determination method aims to determine zones of a territory, called candidate zones $Z_C$, distinct from buildings (in particular roofs of such buildings) and compatible with the installation of photovoltaic panels. In other terms, each candidate zone $Z_C$ typically has dimensions and a shape making possible the installation of one or a plurality of photovoltaic panels on the zone.

Such candidate zones $Z_C$ are thereby formed by an area of one or a plurality of elements of the same nature over several meters long and several meters wide. The elements are in the open-air and suitable for receiving direct sunlight.

In an example of implementation, the candidate zones $Z_C$ are chosen from the group consisting of: outdoor parking lots, wooded areas and bodies of water.

An outdoor parking lot is as a zone intended for parking vehicles. An outdoor parking lot optionally comprises a marking on the ground delimiting the parking spaces of the vehicles. In the case of an outdoor parking lot, the element of the same nature is e.g. the material of the ground surface of the parking lot (concrete, soil).

A wooded area is a zone consisting of an area of trees, shrubs or bushes, as well as vegetation. A forest is an example of a wooded area.

A body of water is a volume of water in an enclosed space. A lake, a pond, a pool and a basin are examples of bodies of water.

The determination method comprises a step 100 of training a classification model on a database comprising images seen from the sky of candidate zones $Z_C$. The step 100 is used for obtaining a classification model trained to classify into the same class, images imaging at least one candidate zone $Z_C$ (i.e. the images of the other classes do not image any candidate zone $Z_C$). The step 100 is implemented by the calculator 10 in interaction with the computer program product 12, i.e. is implemented by computer.

The term "seen from the sky" means that the images were taken from a high point of view making possible e.g. to image the roofs of buildings.

The images of the database are e.g. acquired by a satellite system. In a variant, the images of the database were acquired by an acquisition system (camera) mounted on an aircraft.

The images of the database are e.g. acquired by a satellite system. In a variant, the images of the database were acquired by an acquisition system (camera) mounted on an aircraft.

Preferentially, the images are two-dimensional images. Advantageously, the images are color images.

Preferentially, one or a plurality of images of the database overlap, i.e. have portions of image in common.

Optionally, the images of the database have been filtered beforehand so as to remove the images comprising only predetermined elements distinct from the candidate zones $Z_C$. The predetermined elements are e.g. chosen from the group consisting of: forests, mountains, bodies of water or fields. The above ensures that the classification model is trained on a database of images each imaging at least one candidate zone $Z_C$.

In an example of implementation, each image of the database is labeled with a classification, the classification indicating at least whether the image comprises a candidate zone $Z_C$ or not. The classification was e.g. determined by an operator.

In an example of implementation, the training of the classification model is carried out according to a learning method applied to the database.

The classification model is e.g. a neural network. The learning method model is used for configuring the neural network as the learning thereof progresses on the database. In one example, a part of the database is used for configuring the neural network and the other part for validating the configuration.

Preferentially, the classification model is a binary model (either presence or no presence of a candidate zone $Z_C$). In a variant, the classification model was also trained to determine sub-categories of candidate zones $Z_C$ (e.g. distinction between outdoor parking lots and forests).

The determination method comprises a step 110 of training a segmentation model on a database comprising images seen from the sky of candidate zones $Z_C$. The step 110 is used for obtaining a segmentation model trained to highlight the candidate zones $Z_C$ imaged on images. The step 110 is implemented by the calculator 10 in interaction with the computer program product 12, i.e. is implemented by computer.

The segmentation model is aimed at delimiting the candidate zones $Z_C$ from the other elements imaged on an image.

The database is e.g. the same as the database in step 100 of training the classification model. In a variant, the database is specific to the classification model.

In an example of implementation, the training of the segmentation model is carried out according to a learning method applied to the database.

The classification model is e.g. a neural network. The learning method model is used for configuring the neural network as the learning thereof progresses on the database. In one example, a part of the database is used for configuring the neural network and the other part for validating the configuration.

Preferentially, the segmentation model implements at least one algorithm among a Mask R-CNN (Mask Region Based Convolutional Neural Networks) algorithm and a DeepLab algorithm (e.g. DeepLab V2).

Preferentially, the segmentation model implements at least two segmentation algorithms suitable for highlighting candidate zones $Z_C$. In such case, the candidate zones $Z_C$ highlighted on the processed images $IM_T$, by the trained segmentation model, result from the merging of the results obtained by the two algorithms. For example, one algorithm is a so-called Mask R-CNN algorithm and another algorithm is a so-called DeepLab algorithm (e.g. DeepLab V2).

The determination method comprises a step 120 of reception of images seen from the sky IM of a territory. The territory is a space wherein it is desired to install photovoltaic panels. The territory typically comprises different types of environment, e.g. urban elements and vegetation.

The step 120 is implemented by the calculator 10 in interaction with the computer program product 12, i.e. is implemented by computer.

The determination method comprises a step 130 of classification, by the trained classification model, of each image IM on which at least one candidate zone $Z_C$ is imaged in a first class of images. The step 130 is implemented by the calculator 10 in interaction with the computer program product 12, i.e. is implemented by computer.

Thereby, if the trained classification model performs a binary classification, two classes of images are obtained: a first class of images on which at least one candidate zone $Z_C$ is visible and a second class of images on which no candidate zone $Z_C$ is visible.

The determination method comprises a step 140 of processing, by the trained segmentation model, each image IM of the first class so as to obtain a processed image $IM_T$ on which the shape of each candidate zone $Z_C$ is highlighted. The step 140 is implemented by the calculator 10 in interaction with the computer program product 12, i.e. is implemented by computer.

The step 140 is thereby used for highlighting each candidate zone $Z_C$ (at least the contour) with respect to the other elements imaged on the images.

Figure 3:
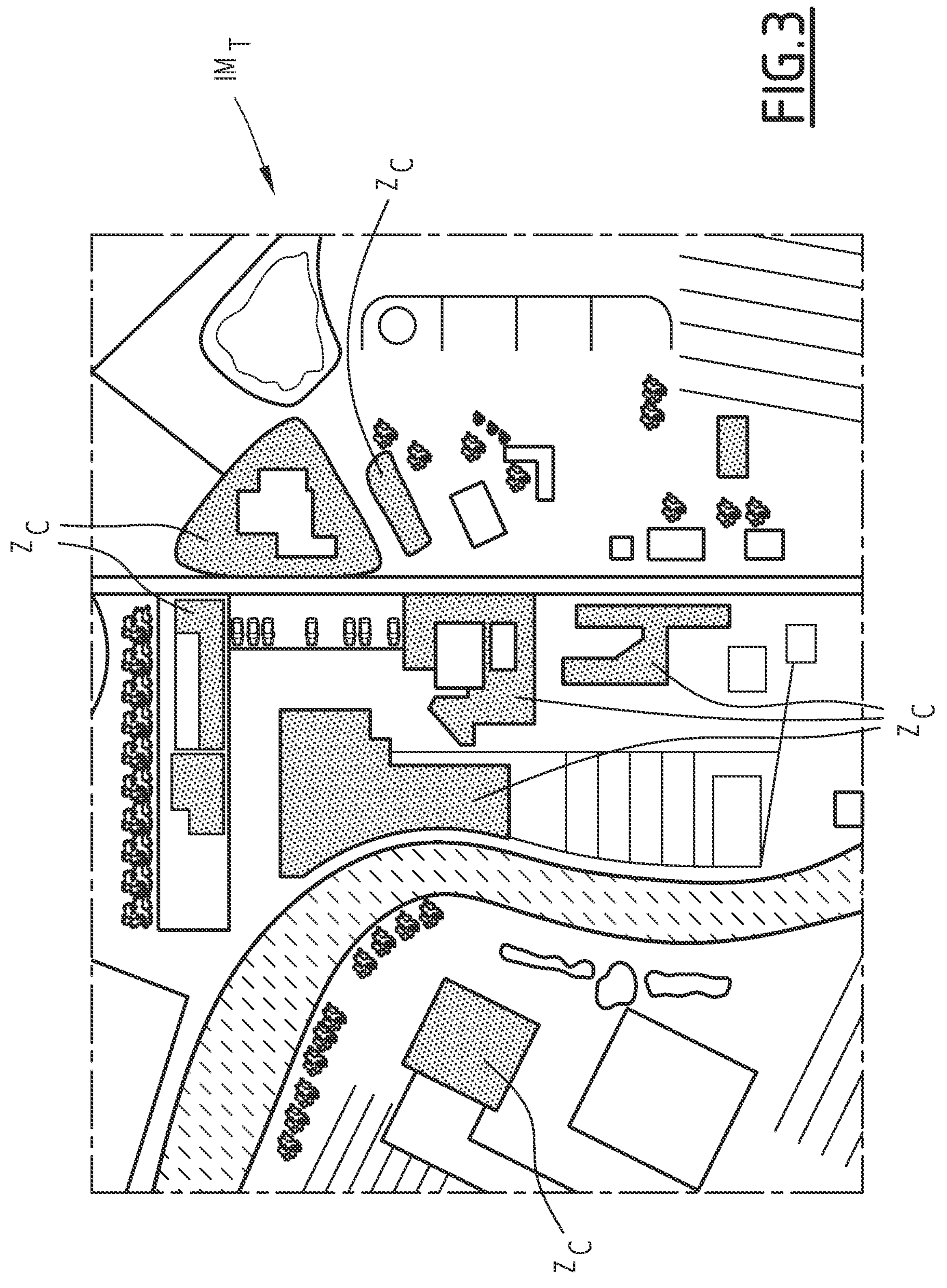

FIG. 3 illustrates an example of an image $IM_T$ of a territory on which the candidate zones $Z_C$ are highlighted (by framing). In said example, the candidate zones $Z_C$ are outdoor parking lots.

The determination method comprises a step 150 of characterizing each candidate zone $Z_C$ by determining, from the shape of the highlighted zone, at least one geometric feature useful for the installation of photovoltaic panels on the candidate zone $Z_C$. The step 150 is implemented by the calculator 10 in interaction with the computer program product 12, i.e. is implemented by computer.

A useful geometric feature for the installation of photovoltaic panels on the candidate zone $Z_C$ is a feature used for organizing the distribution of photovoltaic panels over the candidate zone $Z_C$. Such a feature is used e.g. for determining one among the number, the dimensions or the orientation of the photovoltaic panels which can be installed on the candidate zone $Z_C$. Such a feature can be used e.g. for helping in choosing a candidate zone $Z_C$ rather than another because same makes possible e.g. the installation of a larger number of photovoltaic panels.

In an example of implementation, the characterization step 150 is used for determining one or a plurality of geometrical features among the features described hereinafter.

An example of a geometric feature is a geometric feature relating to the orientation of the longer side (length) of the candidate zone $Z_C$ when the candidate zone $Z_C$ has a substantially rectangular shape. It is thereby possible to determine a layout of photovoltaic panels on the candidate zone $Z_C$.

Typically, when the candidate zones $Z_C$ are outdoor parking lots, the parking lots are arranged along the length of the parking lot, which optimizes the number of spaces. Thereby, knowing the orientation of the longer side (length) of the candidate zone $Z_C$ makes it possible to arrange the photovoltaic panels along the length of the parking lot, and thereby maximize the number of photovoltaic panels.

Another example of a geometric feature is the surface of the candidate zone $Z_C$. Such feature is used for determining the surface area and/or the number of photovoltaic panels which can be installed on the candidate zone $Z_C$.

Yet another example of a geometric feature is a coefficient relating to the rectangularity of the candidate zone $Z_C$. The coefficient of rectangularity is e.g. obtained by comparing the surface area of the candidate zone $Z_C$ with the surface area of the smallest rectangular shape surrounding the shape of the candidate zone $Z_C$ highlighted on the processed image $IM_T$. Such a feature is used for evaluating the effective surface area of the candidate zone $Z_C$ for the installation of photovoltaic panels, the solar panels having conventionally a rectangular shape.

Yet another example of a geometric feature is a geometric feature relating to the footprint, on the candidate zone $Z_C$, of elements such as buildings, exterior to the candidate zone $Z_C$.

The footprint on the ground is the vertical projection of the elements exterior to the candidate zone $Z_C$ onto said candidate zone $Z_C$. The footprint on the ground is thus used for determining the parts of the candidate zone $Z_C$ which are masked (shaded) by exterior elements, i.e. which will not receive direct sunlight.

Advantageously, the characterization step comprises the determination of parts of each candidate zone $Z_C$, shaded by elements exterior to the candidate zone $Z_C$, depending on the footprint of said exterior elements. The shaded parts are advantageously highlighted on the processed image $IM_T$.

Yet another example of a geometric feature is a geometric feature relating to the shape of the candidate zone $Z_C$ after eliminating parts of each candidate zone $Z_C$, masked by parasitic elements. A parasitic element is a predefined element masking the direct sunlight. The masked parts are advantageously filtered or highlighted on the processed image $IM_T$.

Typically, such a geometric feature is used for a more precise evaluation of the surface area of the candidate zone $Z_C$ useful for the installation of photovoltaic panels. The parasitic elements are e.g. zones covered with water in the case where the candidate zones $Z_C$ are outdoor parking lots, such zones covered with water being more difficult to use for the installation of photovoltaic panels.

Optionally, the determination method comprises a step 160 of determining the irradiance of at least one candidate zone $Z_C$ highlighted on the processed images $IM_T$. The step 160 is e.g. implemented by the calculator 10 in interaction with the computer program product 12, i.e. is implemented by computer.

Irradiance, expressed in watts per square meter ($W/m^2$), is the incident radiant flux (power) received by a surface per unit of surface area. The irradiance is e.g. determined by means of an irradiance mapping of the territory under consideration.

Optionally, the determination method comprises a step 170 of manufacturing photovoltaic panels and/or of installing photovoltaic panels on candidate zones of the environment, depending on the geometrical feature(s) determined for each zone, and, if appropriate, on the irradiance determined for each zone.

Thereby, the present method can be used for determining zones of an environment, compatible with the installation of solar panels, the zones being different from buildings. More particularly, the characterization step is used for geometrically characterizing the candidate zones $Z_C$ determined in order to evaluate the compatibility of such zones with the requirements of installation of solar panels. It is thereby possible to evaluate the feasibility and the interest of installing solar panels on said zone (sufficient surface area, optimal layout).

A person skilled in the art will understand that the embodiments and variants described above can be combined so as to form new embodiments provided that same are technically compatible.

Furthermore, the order of the steps of the method is given as an example, since the different steps can be implemented in another order (e.g. the step 110 before the step 100 or again the step 160 before the step 150).

Hereinafter, a specific example of implementation of the determination method is given for the case where the candidate zones are parking lots.

In said example, two databases were built manually, namely:

- a first database for training the classification model comprising 6747 images with parking lots and 6684 images without any parking lot, and
- a second database for training the segmentation model comprising 6747 images with parking lots and labeled with polygons representative of each parking lot.

Each database was divided into two subgroups of data: a first subgroup for learning the corresponding model (about two-thirds of the images) and a second subgroup for testing the model (about one-third of the images).

Each of the two databases was obtained from images seen from the sky of a geographical zone, in the present case France. The images were obtained from publicly available data, via sites such as GoogleEarth, IGN or Sentinel.

The images have each been reviewed by operators who have labeled same by hand with a marking identifying any parking lots on the images. The marking consisted e.g. in pointing the ends of the parking lots via a pointing software, used for obtaining polygons defining the shape and size of the parking lots.

In said example, the classification model is based on a Residual Neural Network (ResNet) and an XGBoost algorithm. The training of the model was carried out on the basis of the first database (learning and validation).

In said example, the segmentation model is based on a merging of the DeepLab V3 and Mask R-CNN algorithms. The training of the model was carried out following such algorithms on the basis of the second database (learning and validation). More particularly, the following rules have been defined for the merging:

- Concerning the surface area of the intersection on the surface area of the union of polygons (polygons materializing parking lots): if the percentage is higher than a given percentage, it is considered there is only one parking lot and same is kept, otherwise same is removed.
- If one of the polygons is sufficiently comprised in the other one, only the smallest is kept.

The trained classification and segmentation models were then used for characterizing parking lots, aiming at the possible installation of photovoltaic panels on the parking lots.

The invention claimed is:

1. A method for determining zones of a territory, called candidate zones, distinct from buildings and compatible with installation of photovoltaic panels, the candidate zones being formed by an area of one or a plurality of elements of a same nature over several meters long and several meters wide, the elements being suitable for receiving direct sunlight, the method being implemented by computer and comprising the following steps:
   - training of a classification model on a database comprising images seen from the sky of candidate zones, for obtaining a classification model trained to classify into a same class, images imaging at least one candidate zone,
   - training of a segmentation model on a database comprising images seen from the sky of candidate zones, for obtaining a segmentation model trained to highlight candidate zones imaged on images,
   - reception of images seen from the sky of a territory,
   - the classification, by the trained classification model, of each image on which at least one candidate zone is imaged, in a first class of images,
   - processing, by the trained segmentation model, of each image of the first class so as to obtain a processed image on which a shape of each candidate zone is highlighted, and
   - characterization of each candidate zone by determining, from the shape of the highlighted zone, at least one geometric feature useful for installing photovoltaic panels on the candidate zone.

2. The method according to claim 1, wherein the at least one geometric feature relates to a footprint, on the candidate zone, of elements such as buildings, exterior to the candidate zone.

3. The method according to claim 2, wherein the step of characterizing comprises a determination of parts of each candidate zone, shaded by elements exterior to the candidate zone, depending on the footprint of said exterior elements.

4. The method according to claim 1, wherein the characterizing step comprises a determination of parts of each candidate zone, on which there is a predefined parasitic element masking the direct sunlight, the at least one geometric feature being relative to the shape of the candidate zone after removal of the masked parts.

5. The method according to claim 1, wherein the at least one geometric feature is a coefficient relating to a rectangularity of the candidate zone, the coefficient of rectangularity being obtained by comparing a surface area of the candidate zone with a surface area of a smallest rectangular shape surrounding the shape of the candidate zone highlighted on the processed image.

6. The method according to claim 1, wherein the at least one geometric feature relates to an orientation of a longer side of the candidate zone when the candidate zone has a substantially rectangular shape, aiming at determining a layout of photovoltaic panels on the candidate zone.

7. The method according to claim 1, wherein the segmentation model implements at least two segmentation algorithms suitable for highlighting candidate zones, the candidate zones highlighted on the processed images, by the trained segmentation model, resulting from a merging of results obtained by the two algorithms.

8. The method according to claim 1, wherein the method comprises a step of determination of an irradiance of at least one candidate zone highlighted on the processed images.

9. The method according to claim 1, wherein the candidate zones are selected from a group consisting of: outdoor parking lots, wooded areas and bodies of water.

10. The method according to claim 3, wherein the shaded parts are highlighted on the processed image.

11. The method according to claim 4, wherein the masked parts are filtered or highlighted on the processed image.

12. The method according to claim 7, wherein one algorithm is a Mask R-CNN algorithm and another algorithm is a DeepLab algorithm.

13. A non-transitory computer readable storage medium on which a computer program product according to claim 1 is stored.

* * * * *